US010599146B2

(12) United States Patent
Wagenmaker et al.

(10) Patent No.: US 10,599,146 B2
(45) Date of Patent: Mar. 24, 2020

(54) ACTION-CONDITIONED VEHICLE CONTROL (71) Applicant: Ford Global Technologies, LLC, Dearborn, MI (US)

(72) Inventors: Andrew Wagenmaker, Okemos, MI (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 15/936,256

(22) Filed: Mar. 26, 2018

(65) Prior Publication Data

US 2019/0294164 A1  Sep. 26, 2019

(51) Int. Cl.
B60W 30/10     (2006.01)
G05D 1/02      (2020.01)
G05D 1/00      (2006.01)
G06N 3/02      (2006.01)

(52) U.S. Cl.
CPC ......... G05D 1/0088 (2013.01); G05D 1/0246 (2013.01); G05D 1/0274 (2013.01); G06N 3/02 (2013.01)

(58) Field of Classification Search
USPC .......................................................... 701/23
See application file for complete search history.

(56) References Cited

U.S. PATENT DOCUMENTS

2016/0325753 A1  11/2016  Stein et al.
2017/0291611 A1  10/2017  Innes et al.
2017/0293837 A1  10/2017  Cosatto et al.
2018/0201273 A1*  7/2018  Xiao ..................... B60W 40/09
2019/0065867 A1*  2/2019  Huang ............... G06K 9/00798
2019/0137294 A1*  5/2019  Jung .................. G01C 21/3635
2019/0164018 A1*  5/2019  Zhu ........................... G06T 5/50
2019/0186937 A1*  6/2019  Sharifi ............... G01C 21/3484

FOREIGN PATENT DOCUMENTS

EP        3219564 A1    9/2017
JP      2016218812 A   12/2016
WO       201720336 A2   7/2017

OTHER PUBLICATIONS

Abby Chin, et al., "Evaluation of Technologies for Road Profile Capture, Analysis, and Evaluation", American Society of Civil Engineers (ASCE), J. Surv. Eng., 2015, 141(1):04014011, pp. 1-13 (13 pages).
Hugh Durrant-Whyte, et al., "Simultaneous Localization and Mapping: Part I Tutorial", IEEE Robotics & Automation Magazine, 1070-9932, Jun. 2006, pp. 99-108 (10 pages).

* cited by examiner

Primary Examiner — Tan Q Nguyen
(74) Attorney, Agent, or Firm — Frank A. MacKenzie; Bejin Bieneman PLC (57) ABSTRACT A high-level vehicle command is determined based on a location of the vehicle with respect to a route including a start location and a finish location. An image is acquired of the vehicle external environment. Steering, braking, and powertrain commands are determined based on inputting the high-level command and the image into a Deep Neural Network. The vehicle is operated by actuating vehicle components based on the steering, braking and powertrain commands.

20 Claims, 6 Drawing Sheets

| STR CMD | P/B CMD |
|---|---|
| 0.000 | -0.001 |
| 0.000 | -0.005 |
| 0.000 | -0.010 |
| 0.010 | -0.050 |
| 0.020 | 0.000 |
| 0.050 | 0.000 |
| 0.050 | 0.000 |
| 0.020 | 0.000 |
| 0.010 | 0.010 |
| 0.000 | 0.020 |

302 — STR CMD
304 — P/B CMD
306

ACTION-CONDITIONED VEHICLE CONTROL

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes and objects to be avoided in the vehicle's environment. For example, safe and comfortable operation of the vehicle can depend upon acquiring accurate and timely information regarding routes and objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of vehicle and use the data to determine vehicle commands to be used to operate a vehicle from a current location to a destination location, for example. The data can include images acquired from video sensors included in a vehicle and the vehicle commands can include operating a vehicle to locations in the acquired images. Portions of vehicle commands can be determined by inputting image data and associated context information to a previously trained DNN, consisting of a DNN, a sub-network to encode context and a sub-network combining the output of the context encoder and the CNN. The associated context information can include codified direction at an upcoming decision point, for example to indicate an upcoming turn direction and distance to turn from a current vehicle location. The CNN can be trained to perform end-to-end operation of a vehicle by training the CNN to determine vehicle commands that can be used operate a vehicle on a portion of a route. A route is defined as a path that describes the successive locations of a vehicle as the vehicle travels on a roadway from a starting location to an ending location, and performing end-to-end operation is defined as providing a number of vehicle command sufficient to operate a vehicle on a route, from start location to finish location. Routes can be determined using maps that include roadways at a scale that includes appropriate detail, for example GOOGLE™ maps.

Disclosed herein is a method, comprising determining a high-level command based on a location of the vehicle with respect to a route including a start location and a finish location, acquiring an image of the vehicle external environment, determining steering, braking and powertrain commands based on inputting the high-level command and the image into a Deep Neural Network, and operating the vehicle by actuating vehicle components based on the steering, braking and powertrain commands. A plurality of high-level commands based on locations of the vehicle can be determined with respect to the route and a plurality of corresponding images of the vehicle external environment can be acquired, wherein the plurality of locations are distributed from the start location to the finish location. A plurality of steering, braking and powertrain commands can be based on inputting the plurality of high-level commands and the plurality of corresponding images into the Deep Neural Network; and the vehicle can thereby be operated to travel from the start location to the finish location along the route by actuating vehicle components based on the plurality of steering, braking and powertrain commands.

The steering, braking and powertrain commands can include torque with which steering, braking and powertrain vehicle components apply force to vehicle wheels to change vehicle location, speed and direction. The Deep Neural Network can include a Convolutional Neural Network including a plurality of pooling layers that process an input image by convolving and down-sampling and one or more fully-connected layers that output image cues based on matrix multiplication and bias offset. The Deep Neural Network can include a Context Sub-Network including a plurality of fully-connected neural network layers that process an input high-level command based on matrix multiplication and bias offset to output high-level command cues. The Context Sub-Network can be trained by inputting recorded locations of the vehicle with respect to the route and back propagating errors based on differences between output high-level command cues and recorded high-level command cues. The Deep Neural Network can include a Neural Sub-Network including a plurality of full-connected neural network layers that input image cues and high-level command cues and output steering, braking and powertrain commands. The Convolutional Neural Network, the Context Sub-Network and the Neural Sub-Network can be trained by inputting recorded high-level commands based on locations of the vehicle with respect to the route into the Context Sub-Network and recorded corresponding images into the Convolutional Neural Network and back propagating errors based on comparing Neural Sub-Network output steering, braking and powertrain commands with recorded steering, braking and powertrain commands. Back propagating errors can include determining image cues and high-level command cues.

The high-level command based on the location of the vehicle with respect to the route can include the location of the vehicle with respect to a map and a representation of the route with respect to a map. The Context Sub-Network can process the high-level command based on the location of the vehicle with respect to a map and a representation of the route with respect to a map to determine high-level command cues. The high-level command cues can include high-level commands and distances. The determined high-level command cues can be based on high-level commands determined by processing locations and routes with respect to a map. The image of the vehicle external environment can include locations associated with the route.

Further disclosed is a computer readable medium, storing program instructions for executing some or all of the above method steps. Further disclosed is a computer programmed for executing some or all of the above method steps, including a computer apparatus, programmed to determine high-level command based on a location of the vehicle with respect to a route including a start location and a finish location, acquire an image of the vehicle external environment, determine steering, braking and powertrain commands based on inputting the high-level command and the image into a Deep Neural Network, and operating the vehicle by actuating vehicle components based on the steering, braking and powertrain commands. A plurality of high-level commands can be determined based on locations of the vehicle with respect to the route and a plurality of corresponding images of the vehicle external environment can be acquired, wherein the plurality of locations are distributed from the start location to the finish location. A plurality of steering, braking and powertrain commands can be based on inputting the plurality of locations of the vehicle with respect to the route and the plurality of corresponding images into the Deep Neural Network; and the vehicle can thereby be operated to travel from the start location to the finish location along the route by actuating vehicle components based on the plurality of steering, braking and powertrain commands.

The steering, braking and powertrain commands can include torque with which steering, braking and powertrain vehicle components apply force to vehicle wheels to change vehicle location, speed and direction. The Deep Neural Network can include a Convolutional Neural Network including a plurality of pooling layers that process an input image by convolving and down-sampling and one or more fully-connected layers that output image cues based on matrix multiplication and bias offset. The Deep Neural Network can include a Context Sub-Network including a plurality of fully-connected neural network layers that process an input high-level command based on matrix multiplication and bias offset to output high-level command cues. The Deep Neural Network can include a Neural Sub-Network including a plurality of full-connected neural network layers that input image cues and high-level command cues and output steering, braking and powertrain commands. The Convolutional Neural Network, the Context Sub-Network and the Neural Sub-Network can be trained by inputting recorded high-level commands into the Context Sub-Network and recorded corresponding images into the Convolutional Neural Network and back propagating errors based on comparing Neural Sub-Network output steering, braking and powertrain commands with recorded steering, braking and powertrain commands.

The location of the vehicle with respect to a route can include the location of the vehicle with respect to a map and a representation of the route with respect to a map. The Context Sub-Network can process the high-level command based on the location of the vehicle with respect to a map and a representation of the route with respect to a map to determine high-level command cues. The high-level command cues can include high-level commands and distances. The recorded high-level commands can be based on high-level commands determined by processing locations and routes with respect to a map. The image of the vehicle external environment can include locations associated with the route.

Additionally, offset. results. recorded vehicle trajectories corresponding results.

Figure 1:
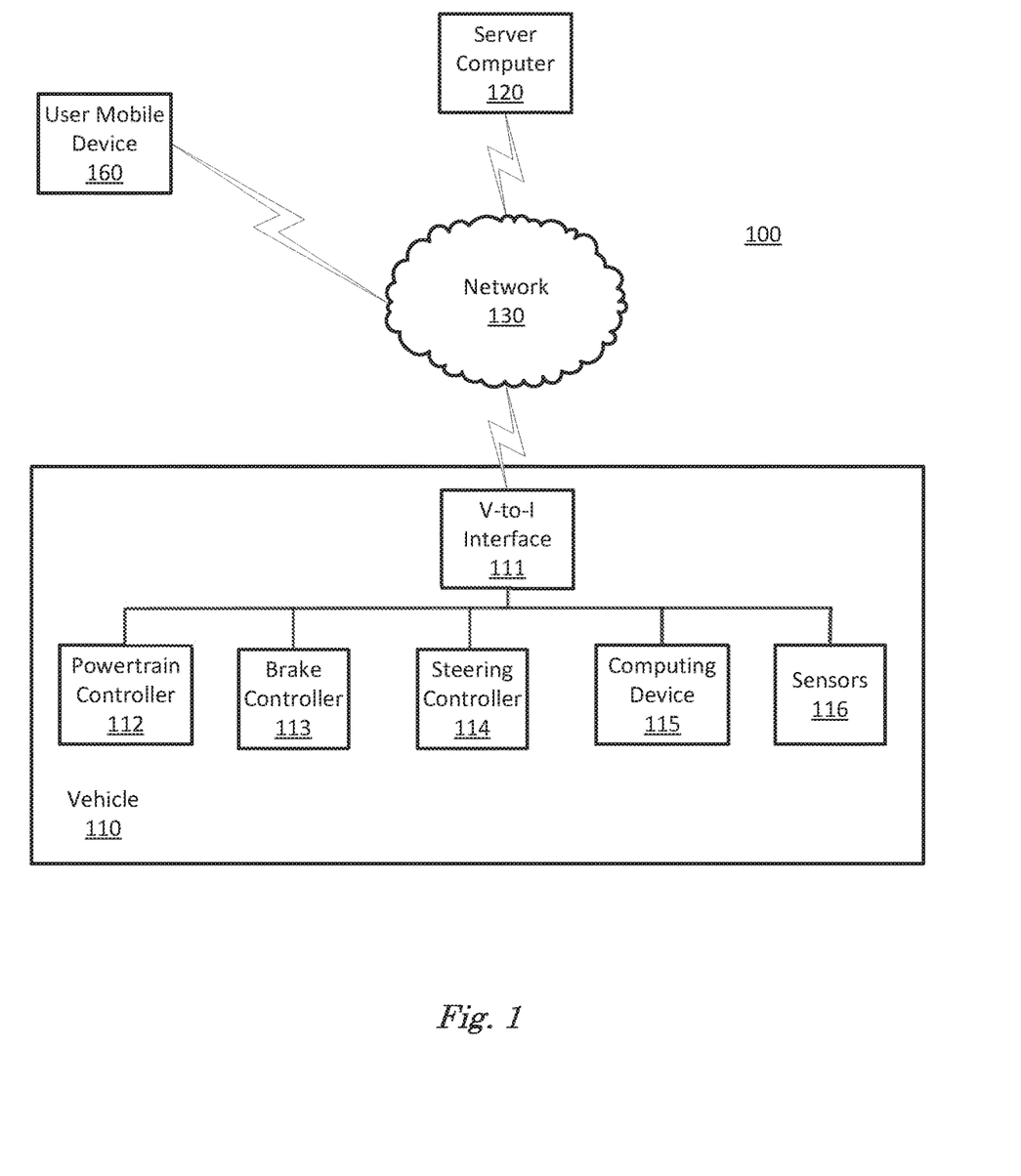
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
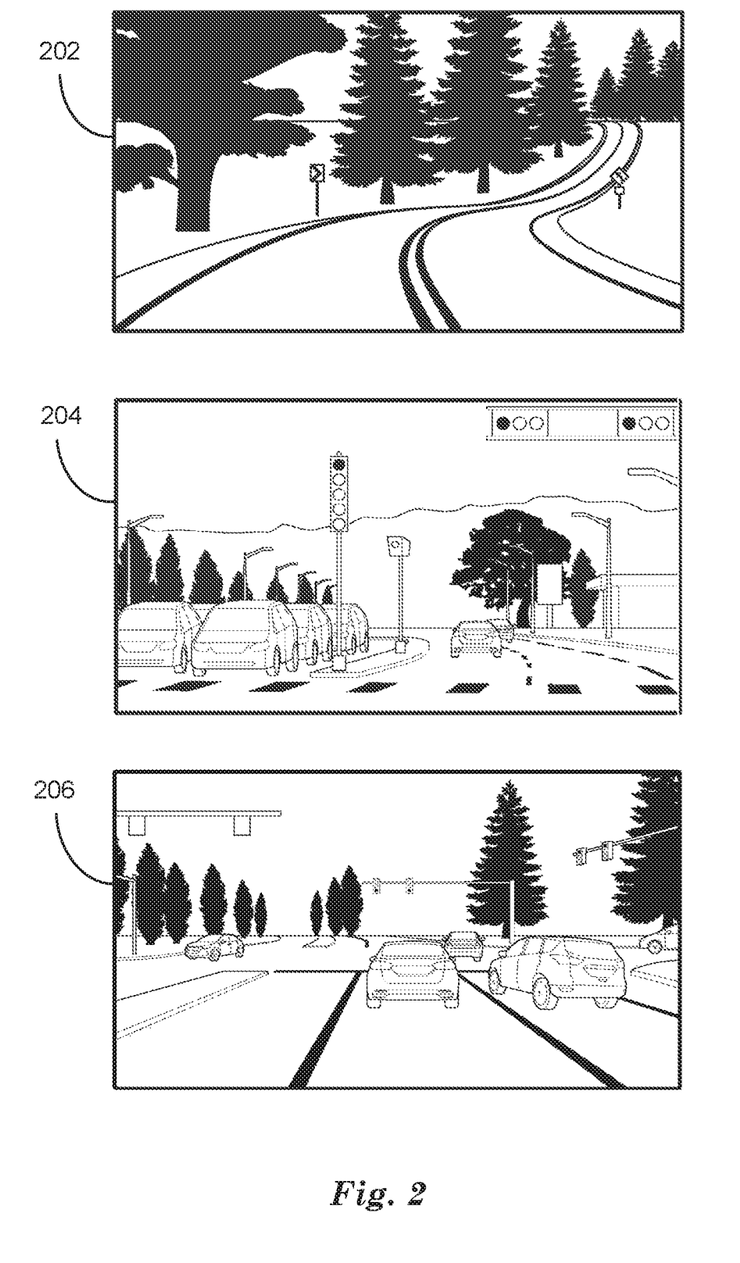
FIG. 2 is a diagram of three example images of vehicle external environments.

FIG. 2 is a diagram of three illustrations of example color images 202, 204, 206 (rendered in black and white to comply with Patent Office rules) of vehicle external environments acquired by a video sensor 116 included in a vehicle 110. The color images 202, 204, 206 can be frames of RGB color video, and have dimensions W=1920× H=1080×D=24 bits. The images 202, 204, 206 can include depictions of roadways, intersections, traffic signs, traffic signals, and other vehicles, as would be typically encountered when operating a vehicle 110 on a public roadway. Images 202, 204, 206 can also include objects such as on and off ramps, bridges, driveways, curves, barriers, pedestrians, and animals and non-roadway objects including foliage and structures.

The images 202, 204, 206 can be acquired while vehicle 110 is operating in autonomous mode at locations on routes while vehicle 110 is traveling from start locations to finish locations, for example. Given the location of the vehicle 110 with respect to the route that is being traveled, including determining the direction based on the start location, a high-level command can be determined that describes a maneuver to be performed by vehicle 110 by operating vehicle 110 that would cause vehicle 110 travel on the route. A non-limiting list of example high-level commands include commands to execute a maneuver such as "travel on a roadway for a distance, in lane", "merge into right lane and turn right at intersection" and "merge into left turn lane and turn into driveway", etc. A high-level command thus includes directions for operation of the vehicle 110 in a manner that changes at least one of the vehicle 110 location, speed and steering angle over time.

A high-level command can be determined based on a vehicle 110 location with respect to a route, for example. Given a start location and a finish location associated with a route, the location of a vehicle 110 with respect to a route, where both the location and the route are defined with respect to a map, the direction of the vehicle 110 with respect to the route can be determined. Once the location and direction are known, a high-level command can be determined using a computer software program for determining driving directions, such as GOOGLE™ maps, etc.

Figure 3:
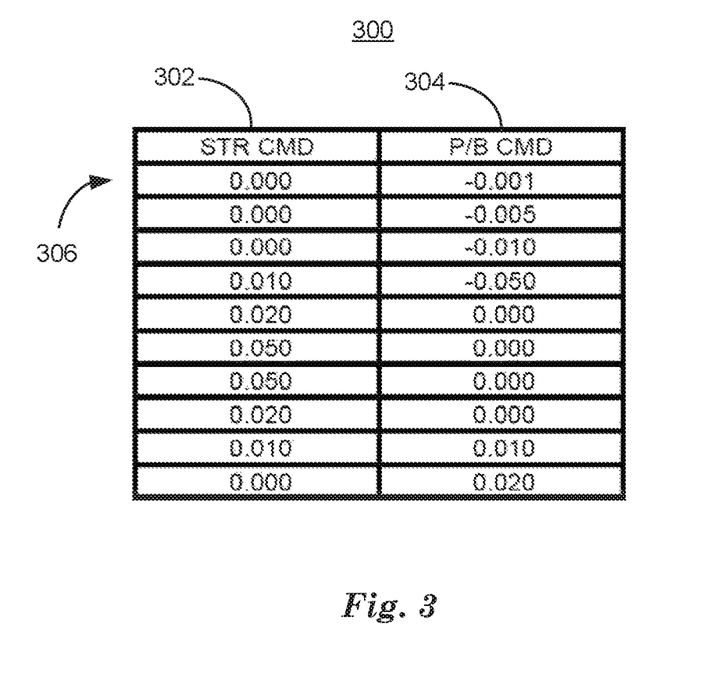
FIG. 3 is a diagram of example vehicle commands.

FIG. 3 is a diagram of an example of a set of vehicle commands 300. Computing device 115 can determine a high-level command based on a route and a location. Computing device 115 can analyze a route based on a map along with a location on a map representing a vehicle 110 location, to determine a high-level command that can be processed by computing device 115 to determine a set of vehicle commands 300 that can be executed by computing device 115 to operate vehicle 110 so as to travel from the vehicle 110 location to a new location traveling along a portion of the route. Computing device 115 can execute the set of vehicle commands 300 by controlling powertrain, steering, and braking via controllers 112, 113, 114 to operate vehicle 110 so as to cause vehicle wheels to turn and rotate with the torques and direction as specified in the set of vehicle commands 300 and thereby cause vehicle 110 to maneuver so as to travel on a portion of a route from a start location to a finish location.

A set of vehicle commands 300 can include one or more rows of vehicle commands 308. A set of vehicle commands 300 can include up to thousands of vehicle commands 308, the number depending upon the sample rate of the vehicle commands 308, where sample rate is defined as the reciprocal of the assumed time step between each vehicle command 308 and the temporal duration of the high-level command. For example, each vehicle command 308 can be converted by computing device 115 into control signals to be sent to controllers 112, 113, 114 to control vehicle 110 powertrain, steering and brakes at an assumed time step, for example every 10 milliseconds. The temporal duration of the high-level command is the time required to operate vehicle 110 from a start location associated with a portion of a route to a finish location associated with a route. For example, each vehicle trajectory 308 can represent control signals to be sent to controllers 112, 113, 114 to control vehicle 110 powertrain, steering and brakes at an assumed time step, for example every 10 milliseconds. Each row of the set of vehicle commands 300 includes a vehicle command 308 that includes a steering command (STR CMD), which is the steering torque, in newton meters (Nm) applied to turn vehicle wheels about a steering axis to change vehicle direction and a powertrain/brake command (P/B CMD), which is both the powertrain torque applied in a rotary direction about an axle (positive values) and braking torque applied about the same axle (negative values). Commands to be sent by computing device 115 to controllers 112, 113, 114 to achieve particular steering, powertrain or braking torque can be determined empirically and stored at computing device 115 memory Computing device 115 can use a set of vehicle commands 300 to operate a vehicle 110 on a roadway. Computing device 115 can determine a high level command cue based on a location and a route, both determined with respect to a map, and combine the high level command cue with image cues determined by processing an image 202, 204, 206 to determine a set of vehicle commands 300, which, when used in sequence at the assumed time step by computing device 115 to control vehicle 110 powertrain, steering and braking, can operate a vehicle 110 to travel a portion of a route from start to finish.

Figure 4:
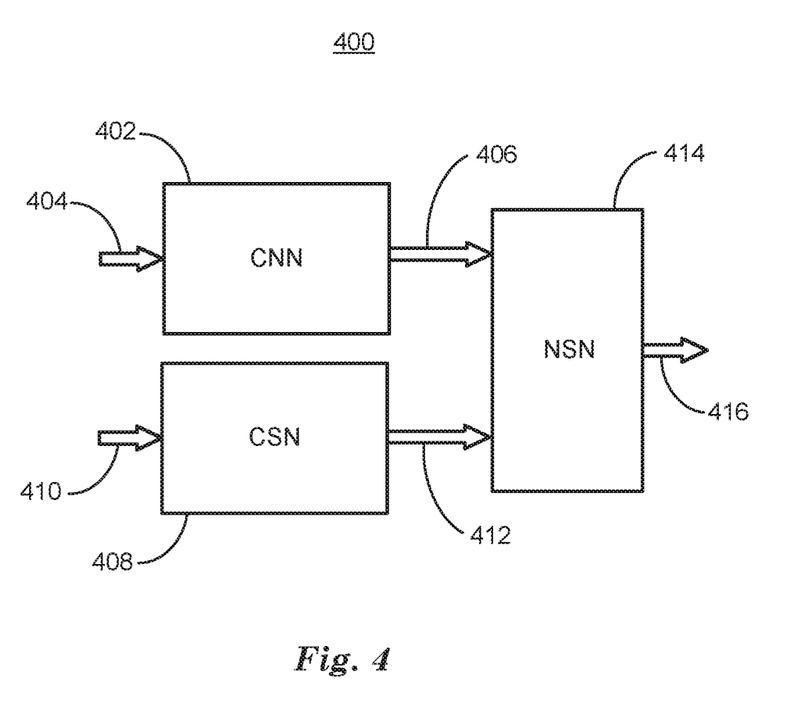
FIG. 4 is a diagram of an example deep neural network (DNN).

FIG. 4 is a diagram of an example DNN 400. DNN 400 can be a software program that can be loaded in memory and executed by a processor included in computing device 115, for example. DNN 400 can be trained to output 408 sets of vehicle commands 300 representing steering, powertrain and braking torques based on inputting 404 an image 202, 204, 206 to Convolutional Neural Network (CNN) 402 inputting 410 a high-level command to Context Sub-Network 408. Computing device 115 can input 404 an image 202, 204, 206 into CNN 408, which outputs image cues 406, and input 410 a high-level command into CSN 408 to produce a high-level command cue 412. Image cues 406 and high-level command cues 412 are input to Neural Sub-Network 414, which outputs 416 a set of vehicle commands 300, which can be used by computing device 115 to operate a vehicle 110 along a portion of a route beginning at the location and corresponding to a portion of the route. By inputting 404 a sequence of images 202, 204, 206 and 410 corresponding high-level commands to DNN 400, where images 202, 204, 206 are acquired as vehicle 110 operates along a route, and each image 202, 204, 206 is associated with a corresponding high-level command based on a location with respect to the route based on its estimated location on a map. Vehicle 110 estimated location can be determined by inputting data from location sensors 116 including GPS, six-axis accelerometer-based inertial navigation systems (INS) or odometer/compass-based systems. For each image 202, 204, 206 input 404 and each high-level command input 410, DNN 400 outputs a set of commands 300 that computing device 115 can use to operate vehicle 110 along a portion of a route. Computing device 115 can be programmed to acquire a new image I and new location with respect to the route to input 404, 410 to DNN 400 before computing device 115 has finished operating vehicle 110 to the finish location on the current portion of the route, for example. In this fashion computing device 115 can operate vehicle 110 along a route from start to finish without interruption based on sets of vehicle commands 300 output 416 from DNN 400, thereby achieving end-to-end navigation of the route DNN 400 can include CNN 402, which can include a plurality of convolutional layers, which convolve and down sample input 404 images 203, 204, 206 for forward propagation of intermediate results 406 between adjacent convolutional layers. Convolutional layers C1-C10 down sample intermediate results 406 by pooling, wherein a group of neighboring pixels in a convolutional layer, for example a 2×2 neighborhood, are pooled together to form one pixel representing the group in output intermediate results having ½ the resolution of the input intermediate results in both x and y. For example, max pooling selects the maximum pixel value to represent each 2×2 neighborhood group. Each convolutional layer can input intermediate results 406 at one resolution, convolve it with one or more kernels, pool the results and output intermediate results 406 at a lower resolution.

Following convolutional layers, intermediate results are output to fully-connected layers. Each element of fully-connected layer is connected to each element of the succeeding fully-connected layer, meaning that each element of the succeeding layer can be determined as a function of all or any of the elements of the preceeding fully connected layer. This permits CNN 402 to form a set of image cues 406 to output to NSN 414. Image cues 406 are arrays of data values extracted by CNN 402 from input 404 image 202, 204, 206 based on training described below that can be combined by NSN 414 with input high-level command cue 412 to output 416 a set of vehicle commands 300. Image cues 406 are intermediate data representations of image 202, 204, 206 data determined by CNN 402. Image cues 406 are determined based on training CNN 402 and NSN 414 to output 416. sets of vehicle commands 300.

DNN 400 can be trained to output a set of vehicle commands 300 in response to inputting 410 high level commands into CSN 408 while inputting 404 an image 202, 204, 206 into CNN 402. Image cues 406 and high-level command cues 412 are input to NSN 414, which outputs 416 sets of vehicle commands 300. CNN 402, CSN 408 and NSN 414 can be trained simultaneously by back propagating errors between output 416 sets of vehicle commands 300 and predetermined sets of vehicle commands 300. Sets of vehicle commands 300 can be predetermined by determining sets of vehicle commands based on the location and route input 410 to CSN 408. The location and route can be analyzed using polynomial curve fitting and control theoretic calculations to determine lateral and longitudinal accelerations and initial conditions including speed and direction of vehicle 110 that can cause vehicle 110 to operate along a portion of the route starting at the location and continuing to a finish location while maintaining speed, lateral acceleration, and longitudinal acceleration within predetermined safety (upper) and efficiency (lower) limits.

The speeds and lateral and longitudinal accelerations per unit time can be analyzed by computing device 115 using control theoretic calculations to determine sets of vehicle commands 300 that will cause vehicle 110 to achieve determined speeds and lateral and longitudinal accelerations to operate so as to travel along the route.

Predetermined sets of vehicle commands 300 can be determined by curve fitting and control theoretic calculations as discussed above or recorded while a vehicle 110 is being operated along a portion of a route starting at a location, for example. The predetermined sets of vehicle commands 300 associated with an input 410 high-level command and an input 404 image 202, 204, 206 can be compared to an output 416 set of vehicle commands 300 based on processing an input 410 high-level command and an input 404 image 202, 204, 206 and thereby provide error terms to back propagate and thereby provide positive or negative feedback to train CNN 402, CSN 408, and NSN 414. Once trained in this fashion, in response to inputting 404 a plurality of images 202, 204, 206 and inputting 410 a plurality of corresponding high-level commands, DNN 400 can output 416 a plurality of sets of vehicle commands 300 that can operate vehicle 110 along a route from a start location to a finish location, thereby achieving end-to-end operation of vehicle 110.

Figure 5:
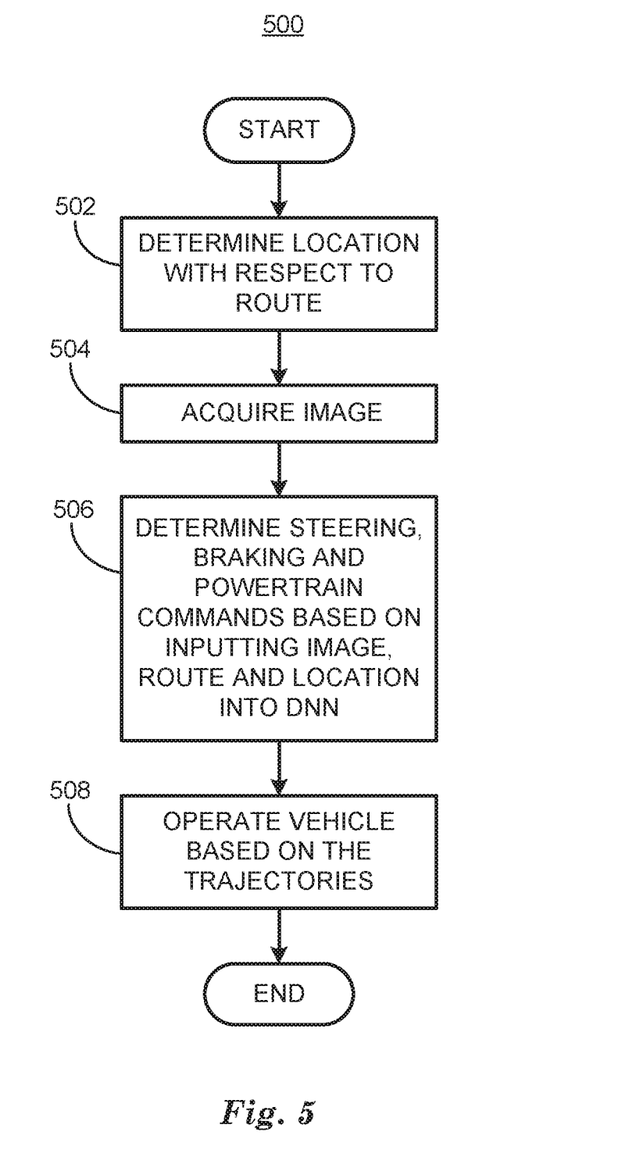
FIG. 5 is a diagram of example process to operate a vehicle based on vehicle commands determined by a DNN.

FIG. 5 is a diagram of a flowchart, described in relation to FIGS. 1-4, of a process 500 for operating a vehicle based on determining a set of vehicle commands 300. Process 500 can be implemented by a processor of computing device 115, taking as input information from sensors 116, and executing commands and sending control signals via controllers 112, 113, 114, for example. Process 500 includes multiple steps taken in the disclosed order. Process 500 also includes implementations including fewer steps or can include the steps taken in different orders.

Process 500 begins at step 502, where a computing device 115 included in a vehicle 110 determines a high-level command based on a location with respect to a route. The high-level command can be based on a location and a route that can both be determined with respect to a map. The location can be based on an estimated location determined by computing device 115 based on sensor 116 data including GPS as discussed above in relation to FIG. 3.

At step 502, computing device 115 acquires an image 202, 204, 206 that can be input to DNN 400. Image 202, 204, 206 can be a color video image as discussed above in relation to FIG. 2, or image 202, 204, 206 can include LIDAR, radar, infrared (IR), or other imaging modality sensor 116. DNN 400 can be modified to include multiple CNNs 402 to process data from multiple imaging modality sensors 116 including interconnects to permit sensor 116 fusion.

At step 504, computing device 115 inputs 404 image 202, 204, 206 into trained DNN 400 along with inputting 410 a high-level command. DNN 400 has been trained based on a plurality of locations, routes and images 202, 204, 206 as discussed in relation to FIG. 4 with a plurality of predetermined high-level commands and sets of vehicle commands 300. DNN 400 can process an input 404 image 202, 204, 206 and, based on an input 410 high-level command, output 416 a set of vehicle commands 300 that can be used to operate vehicle 110 to travel a portion of a route from a start location to a finish location.

At step 506, computing device 115 uses the set of vehicle commands 300 output 408 from trained CNN 400 to operate vehicle 110. Computing device 115 can use the output 408 vehicle commands 300 directly to operate vehicle 100, without fitting polynomial curves or performing control theoretic calculations on route data. While computing device 115 is operating vehicle 110 based on the output 408 set of vehicle commands 300, computing device 115 can modify the set of vehicle commands 300 in real time to accommodate traffic including other vehicles, bicycles, pedestrians, etc. and comply with traffic signals and detours. as discussed above in relation to FIG. 3, based on data acquired in real time by location, video, or LIDAR sensors, for example. Following this step process 500 ends.

Figure 6:
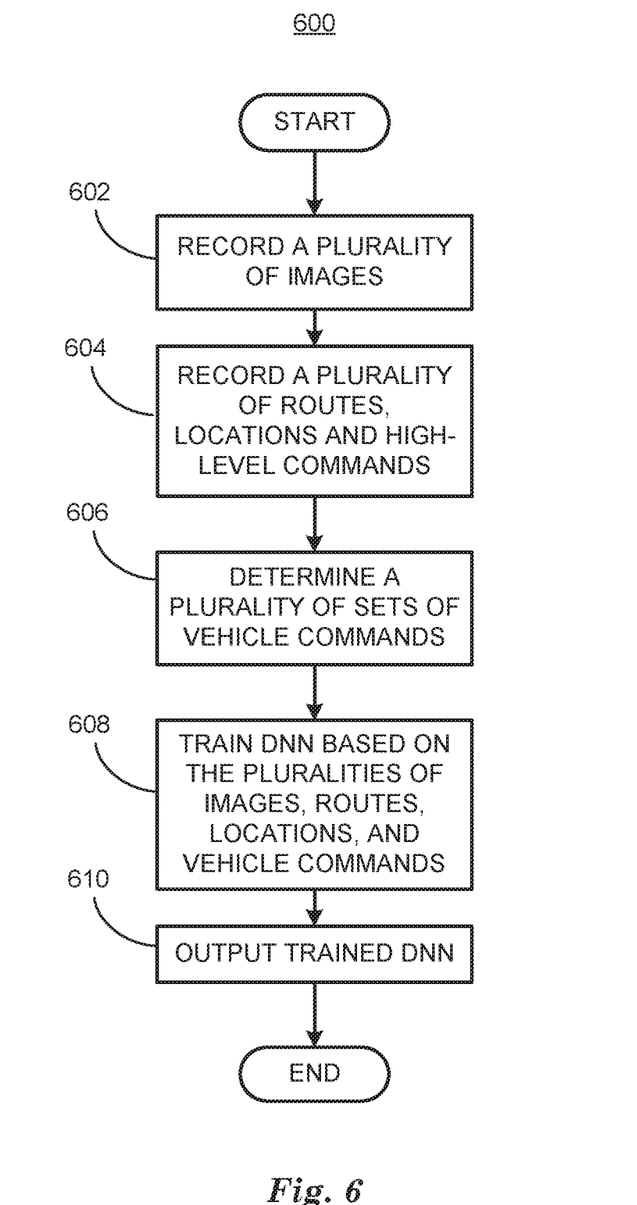
FIG. 6 is a diagram of example process to train a DNN to determine vehicle commands.

FIG. 6 is a diagram of a flowchart, described in relation to FIGS. 1-4, of a process 600 for training a DNN to output sets of vehicle commands 300. Process 600 can be implemented by a processor of computing device 115, taking as input information from sensors 116, and executing commands and sending control signals via controllers 112, 113, 114, for example. Process 600 includes multiple steps taken in the disclosed order. Process 600 also includes implementations including fewer steps or can include the steps taken in different orders.

Process 600 begins at step 602, where a computing device 115 included in a vehicle 110 acquires and records images 202, 204, 206. The images can be acquired by a color video sensor 116, for example as discussed in relation to FIG. 2, above, or the images can be acquired using LIDAR, radar, or IR sensors, for example. The images 202, 204, 206 can each be acquired while vehicle 110 is being operated on a route.

At step 604, computing device 115 records a plurality of high-level commands based on locations corresponding to the images 202, 204, 206 recorded at step 602. Each location is determined with respect to a route, and a high-level command is determined for each location that corresponds to the operation of a vehicle on the route at that location as discussed above in relation to FIG. 4.

At step 606, computing device 115 determines a plurality of sets of vehicle commands 308 associated with the plurality of high-level commands and images. Sets of vehicle commands 308 can be determined for each high-level command by determining estimated vehicle speeds, and lateral and longitudinal accelerations that can cause vehicle 110 to operate vehicle 110 along the portion of the route associated with the high-level command from step 604 and, using polynomial curve fitting and control theoretic calculations, determine a set of vehicle commands 300 as discussed above in relation to FIG. 4, above.

At step 608 DNN 400 is trained by first inputting 410 high-level commands into CSN 408, while inputting 404 images 202, 204, 206 to CNN 402, to form output 416 sets of vehicle commands 300 by NSN 414. Output 416 sets of vehicle commands 300 are compared to predetermined sets of vehicle commands 300 to be back propagated and thereby train CNN 402 and NSN 414 as discussed above in relation to FIG. 4.

At step 610 computing device 115 outputs trained DNN 400. The trained DNN 400 includes information regarding high-level commands, convolution kernels and polynomial functions used to determine and output 416 sets of vehicle commands 300 based on input 404 images 202, 204, 206 and input 410 high-level commands. Outputting the trained DNN 400 can include storing the trained DNN 400 in nonvolatile memory included with the computing device 115, where the trained DNN 400 can be recalled and executed by computing device 115 to output 408 sets of vehicle commands 300 to be used by computing device 115 to operate vehicle 110. Following this step process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
    determining a high-level command based on a location of a vehicle with respect to a route including a start location and a finish location, wherein the high-level command comprises a command to execute a maneuver to be performed by the vehicle;
    acquiring an image of the vehicle external environment;
    generating a high-level command cue at a Context Sub-Network of a Deep Neural Network based on the high-level command, wherein the high-level command cue comprises high-level commands and distances;
    generating an image cue at a Convolutional Neural Network of the Deep Neural Network based on the image, wherein the image cue comprises an array of data values extracted by the Convolutional Neural Network from the image;
    determining steering, braking and powertrain commands at a Neural Sub-Network of the Deep Neural Network based on the high-level command cue and the image cue; and
    operating the vehicle by actuating vehicle components based on the steering, braking and powertrain commands.

2. The method of claim 1, further comprising determining a plurality of high-level commands based on locations of the vehicle with respect to the route and acquiring a plurality of corresponding images of the vehicle external environment, wherein the plurality of locations are distributed from the start location to the finish location.

3. The method of claim 2, further comprising determining a plurality of steering, braking and powertrain commands based on inputting the plurality of high-level commands and the plurality of corresponding images into the Deep Neural Network; and thereby operating the vehicle to travel from the start location to the finish location along the route by actuating vehicle components based on the plurality of steering, braking and powertrain commands.

4. The method of claim 1, wherein the steering, braking and powertrain commands include torque with which steering, braking and powertrain vehicle components apply force to vehicle wheels to change vehicle location, speed and direction.

5. The method of claim 1, wherein the Convolutional Neural Network includes a plurality of pooling layers that process an input image by convolving and down-sampling and one or more fully-connected layers that output the image cues based on matrix multiplication and bias offset.

6. The method of claim 5, wherein the Context Sub-Network includes a plurality of fully-connected neural network layers that process an input high-level command based on matrix multiplication and bias offset to output the high-level command cues.

7. The method of claim 6, wherein the Neural Sub-Network includes a plurality of full-connected neural network layers that process the input image cues and the high-level command cues and output the steering, braking and powertrain commands.

8. The method of claim 7, wherein the Convolutional Neural Network, the Context Sub-Network and the Neural Sub-Network are trained by inputting recorded high-level commands based on recorded locations with respect to the route into the Context Sub-Network and recorded corresponding images into the Convolutional Neural Network and back propagating errors based on comparing Neural Sub-Network output steering, braking and powertrain commands with recorded steering, braking and powertrain commands.

9. The method of claim 8, wherein back propagating errors includes determining the image cues and the high-level command cues.

10. A system, comprising a processor; and
a memory, the memory including instructions to be executed by the processor to:
   determine a high-level command based on a location of a vehicle with respect to a route including a start location and a finish location, wherein the high-level command comprises a command to execute a maneuver to be performed by the vehicle;
   acquire an image of a vehicle external environment;
   generating a high-level command cue at a Context Sub-Network of a Deep Neural Network based on the high-level command, wherein the high-level command cue comprises high-level commands and distances;
   generating an image cue at a Convolutional Neural Network of the Deep Neural Network based on the image, wherein the image cue comprises an array of data values extracted by the Convolutional Neural Network from the image;
   determine steering, braking and powertrain commands at a Neural Sub-Network of the Deep Neural Network based on the high-level command cue and the image cue; and
   operate the vehicle by actuating vehicle components based on the steering, braking and powertrain commands.

11. The processor of claim 10, further comprising determining a plurality of high-level commands based on locations of the vehicle with respect to the route and acquiring a plurality of corresponding images of the vehicle external environment, wherein the plurality of locations are distributed from the start location to the finish location.

12. The processor of claim 11, further comprising determining a plurality of steering, braking and powertrain commands based on the plurality of high-level commands and the plurality of corresponding images into the Deep Neural Network; and thereby operating the vehicle to travel from the start location to the finish location along the route by actuating vehicle components based on the plurality of steering, braking and powertrain commands.

13. The processor of claim 12, wherein the steering, braking and powertrain commands include the torque with which steering, braking and powertrain vehicle components apply force to vehicle wheels to change vehicle location, speed and direction.

14. The processor of claim 10, wherein the Convolutional Neural Network includes a plurality of pooling layers that process an input image by convolving and down-sampling and one or more fully-connected layers that output the image cues based on matrix multiplication and bias offset.

15. The processor of claim 14, wherein the Context Sub-Network includes a plurality of fully-connected neural network layers that process an input high-level command based on matrix multiplication and bias offset to output the high-level command cues.

16. The processor of claim 15, wherein the Neural Sub-Network includes a plurality of full-connected neural network layers that process the input image cues and the high-level command cues and output the steering, braking and powertrain commands.

17. The processor of claim 16, wherein the Convolutional Neural Network, the Context Sub-Network and the Neural Sub-Network are trained by inputting recorded high-level commands based on recorded locations with respect to the route and recorded corresponding images into the Convolutional Neural Network and back propagating error based on comparing Neural Sub-Network output steering, braking and powertrain commands to with recorded steering, braking and powertrain commands.

18. The processor of claim 17, wherein back propagating errors includes determining the image cues and the high-level command cues.

19. A system, comprising:
a video sensor operative to acquire an image of a vehicle external environment;
a Deep Neural Network;
vehicle components operative to operate a vehicle;
a processor; and
a memory, the memory including instructions to be executed by the processor to:
   determine a high-level command based on a location of the vehicle with respect to a route including a start location and a finish location, wherein the high-level command comprises a command to execute a maneuver to be performed by the vehicle;
   acquire an image of a vehicle external environment;
   generating a high-level command cue at a Context Sub-Network of the Deep Neural Network based on the high-level command, wherein the high-level command cue comprises high-level commands and distances;
   generating an image cue at a Convolutional Neural Network of the Deep Neural Network based on the image, wherein the image cue comprises an array of data values extracted by the Convolutional Neural Network from the image;
   determine steering, braking and powertrain commands at a Neural Sub-Network of the Deep Neural Network based on the high-level command cue and the image cue; and
   operate the vehicle by actuating vehicle components based on the steering, braking and powertrain commands.

20. The processor of claim 19, further comprising determining a plurality of high-level commands based on and acquiring a plurality of corresponding images of the vehicle external environment, wherein the plurality of locations are distributed from the start location to the finish location.

* * * * *